(12) United States Patent
Richter et al.

(10) Patent No.: US 7,731,236 B2
(45) Date of Patent: Jun. 8, 2010

(54) ROTATING JOINT WITH CAPTURED WASHER ASSEMBLY AND METHOD

(75) Inventors: Steven J. Richter, St. Clair Shores, MI (US); George J. Strnad, Rochester, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 445 days.

(21) Appl. No.: 11/672,218

(22) Filed: Feb. 7, 2007

(65) Prior Publication Data
US 2008/0185901 A1   Aug. 7, 2008

(51) Int. Cl.
*B60R 22/00* (2006.01)

(52) U.S. Cl. .................. 280/801.1; 280/808; 297/468; 297/482; 297/483

(58) Field of Classification Search ............. 280/801.1, 280/808, 802; 297/468, 482; 24/713.6, 713.7, 24/265 R
See application file for complete search history.

(56) References Cited

U.S. PATENT DOCUMENTS

| | | | | |
|---|---|---|---|---|
| 3,053,046 A * | 9/1962 | Fleming, Jr. | ............. | 411/80.2 |
| 3,193,335 A * | 7/1965 | Wing | ............. | 384/296 |
| 4,611,854 A * | 9/1986 | Pfeiffer | ............. | 297/468 |
| 4,763,926 A * | 8/1988 | Doty | ............. | 280/808 |
| 4,881,292 A * | 11/1989 | Hoferer et al. | ............. | 24/713.6 |
| 5,618,142 A * | 4/1997 | Sonden et al. | ............. | 411/29 |
| 5,735,021 A * | 4/1998 | Briggs | ............. | 16/369 |
| 6,033,030 A * | 3/2000 | Valasin | ............. | 297/483 |
| 6,142,525 A * | 11/2000 | Boelstler et al. | ............. | 280/808 |
| 6,374,455 B1 * | 4/2002 | Regele et al. | ............. | 16/2.1 |
| 6,776,424 B2 * | 8/2004 | Sellers | ............. | 280/18 |
| 7,445,244 B2 * | 11/2008 | Taylor | ............. | 280/801.2 |
| 7,527,296 B2 * | 5/2009 | Kojima et al. | ............. | 280/801.1 |
| 2001/0014997 A1 * | 8/2001 | Suzuki et al. | ............. | 24/265 R |
| 2008/0018088 A1 * | 1/2008 | Gray | ............. | 280/808 |
| 2008/0136156 A1 * | 6/2008 | Haas et al. | ............. | 280/801.1 |
| 2008/0277915 A1 * | 11/2008 | Fujii et al. | ............. | 280/801.1 |
| 2009/0229087 A1 * | 9/2009 | Schneider | ............. | 24/197 |

* cited by examiner

*Primary Examiner*—Eric Culbreth
*Assistant Examiner*—Karen Jane J Amores
(74) *Attorney, Agent, or Firm*—Quinn Law Group, PLLC

(57) ABSTRACT

A rotating joint is provided having a washer with a through-hole, a base, and a shoulder; a rotatable member having a primary hole circumscribing the center hole and sandwiched between the shoulder and base; and a fastener having a shaft that is insertable into the through-hole and connected with a mating threaded receptacle for applying a clamping force on the washer for preventing axial movement of the member while allowing the member to rotate. The shoulder is rolled, and the fastener is non-shouldered and does not use a load distribution washer. The rotatable member includes an opening for connecting a seat belt when the joint is used as a seat belt anchor. The shoulder has a lip overhanging the base, and the rotatable member is positioned therebetween. A method is also provided wherein the joint is captured by the washer separately from the application of the clamping force.

4 Claims, 2 Drawing Sheets

US 7,731,236 B2

ROTATING JOINT WITH CAPTURED WASHER ASSEMBLY AND METHOD

TECHNICAL FIELD

The present invention relates to a rotatable joint assembly having a captured washer, and in particular to a rotatable joint assembly having a rotating member and a clampable washer suitable for maintaining an applied clamping load in a compact area using a standard, non-shouldered fastener.

BACKGROUND OF THE INVENTION

In an automotive interior, aesthetic trim and appearance are often important design considerations. For example, the form, fit, and functionality of seats, seat belts, and other such equipment and accessories found within a vehicle passenger compartment or cabin are carefully evaluated and selected with an eye toward minimizing or eliminating any unattractive trim gaps or openings that may impart an unattractive or unfinished appearance. Vehicle interiors often utilize complex or multi-component rotating joint assemblies, such as seat belt anchors mounted with respect to a side pillar or B-pillar, or other such devices requiring unimpeded rotational movement in more than one rotational direction. Often, such complex rotating joints are difficult to work with during vehicle interior assembly due to the size of the joint and/or the limited space in which an assembly worker has to work on certain vehicle trim panels.

Current methods and devices for achieving a suitable rotating joint typically include the use of shouldered fasteners, i.e., bolts, studs, rivets, load distribution washers and/or spacers, bushings, or other such fasteners having multiple pieces or complex structural features. However, these devices have certain inherent disadvantages, and therefore their use may be less than optimal. For example, the relative complexity of custom shouldered fasteners and associated joint assemblies often carry additional costs, increased size, and/or challenging dimensions that may in some ways inhibit installation of the joint or any devices attached thereto. As noted hereinabove, this may be true in particular when installing automotive interior components within a limited space.

SUMMARY OF THE INVENTION

Accordingly, a rotating joint is provided having a washer that at least partially entraps a separate rotatable member, wherein the washer is adapted to receive an applied clamping force for securing the joint to a surface while allowing the rotatable member to rotate freely with respect to the washer.

In one aspect of the invention, the washer includes a shoulder suitable for restricting axial motion of the rotatable member.

In another aspect of the invention, the shoulder is a deformed portion of the washer forming a lip suitable for restricting axial motion of the rotatable member.

In another aspect of the invention, the rotating joint includes a standard, non-shouldered fastener having a head suitable for restricting axial motion of the rotatable member in one direction.

In another aspect of the invention, a seat belt anchor assembly is provided for securing a seat belt to a vehicle interior, including a shouldered washer having a shoulder overhanging a base and a through-hole formed entirely through the washer, a rotatable member having a first opening coaxially circumscribing the through-hole and a second opening configured to receive seat belt webbing, and a fastener circumscribed by the through-hole, and a threaded receptacle configured to receive a fastener shaft, wherein the rotatable member is positioned between the shoulder and base and is restricted from moving in the axial direction by the lip, and wherein the fastener applies a sufficient clamping force on the shoulder when inserted into the receptacle to thereby retain the assembly to the vehicle interior while allowing the rotatable member to freely rotate.

In another aspect of the invention, a method is provided for attaching a rotating joint to a vehicle, including configuring a washer with a sufficient shoulder portion to capture a rotatable member thereon, and applying a sufficient clamping load to the washer to allow the rotatable member to rotate while the clamping load maintains the rotating joint on the vehicle.

In another aspect of the invention, the method includes rolling or deforming the washer to form a lip thereon, and capturing of the rotatable member includes entrapping the member under the lip.

In another aspect of the invention, configuring of the washer and applying of the clamping load are performed separately.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
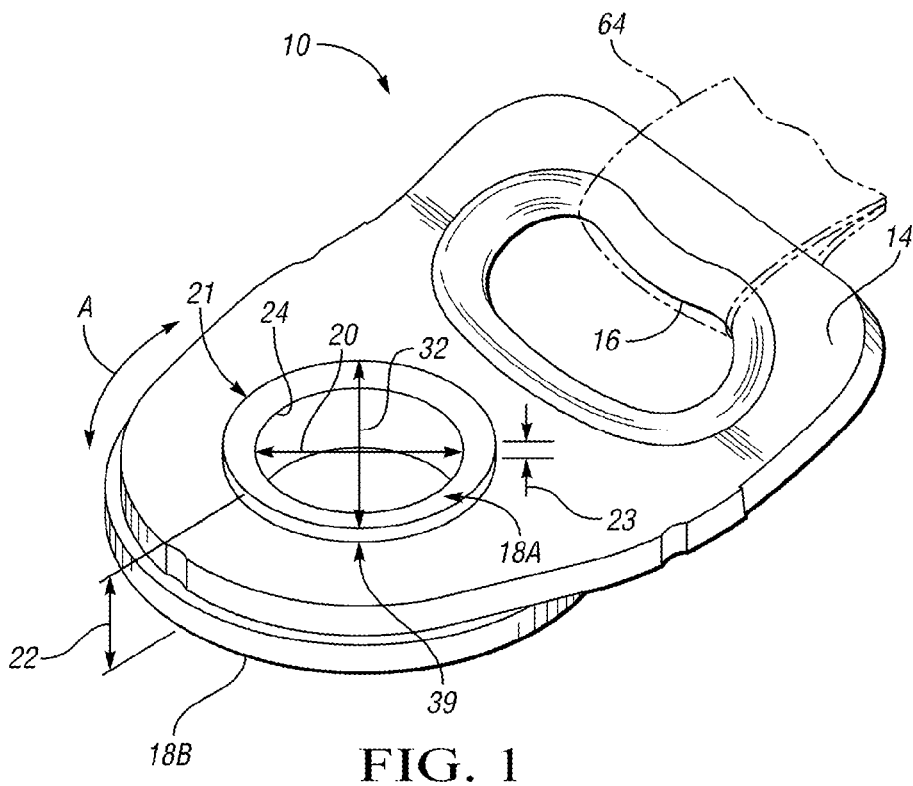
FIG. 1 is a schematic perspective view of a rotating joint according to the invention.

Referring to the drawings wherein like reference numbers correspond to like or similar components throughout the several figures, there is shown in FIG. 1 a perspective view of rotating joint 10 having a rotatable member 14. The rotatable member 14 is preferably configured as a seat belt anchor, as shown in FIG. 1, however any joint requiring unimpeded or free rotation in two rotational directions, as represented by arrow A, may be useable within the terms of the invention, for example a rotating buckle, arm, leg, or trim bracket. The rotating joint 10 includes a shouldered washer 21 that is connected or attached to or captured on the rotatable member 14 by sandwiching, trapping, or otherwise containing the rotatable member 14 at least partially within the shouldered washer 21, as will be explained in greater detail later hereinbelow.

The rotatable member 14 preferably includes a connection hole or opening 16 providing a suitable location or position for securely attaching a component, such as seat belt webbing 64 (also see FIG. 4), and therefore the opening 16 is preferably sized, shaped, and/or contoured appropriately according to the required or intended use of the rotating joint 10. For example, if used as a seat belt anchor, the opening 16 preferably is smoothly finished in an aesthetically pleasing manner so as not to damage or fray the seat belt webbing attached thereto. The rotating member 14 may be constructed of any material having a suitable strength for the intended application, such as brushed stainless steel, chrome, painted carbon steel, or heavy duty plastic.

Figure 2A:
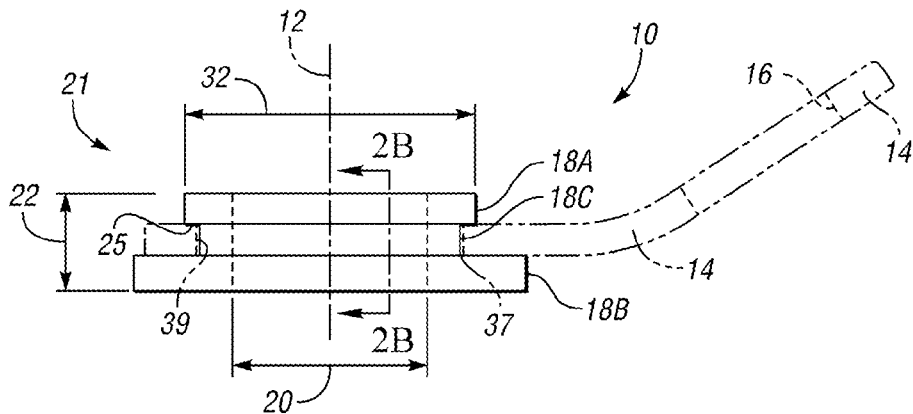
FIG. 2A is a schematic side view of the rotating joint of FIG. 1.

Turning to FIG. 2A, the shouldered washer 21 has a shoulder or shoulder portion 18A forming an overhang or lip 25 thereunder (also see FIG. 2B), a base portion 18B, and a recessed middle portion 18C connecting portions 18A and 18B, with shoulder portion 18A, base portion 18B, and middle portion 18C preferably formed in one piece, such as from a single piece of steel, or injection molded to form a unitary piece. Shoulder portion 18A is positioned or disposed above the rotatable member 14, and the base portion 18B is positioned or disposed below the rotatable member 14, thereby sandwiching or trapping the rotatable member 14 between the shoulder portion 18A and base portion 18B around middle portion 18C to thereby minimize any axial motion or movement of the rotatable member 14. Shouldered portion 18A includes a shoulder height 23, an external diameter 32, and a through-hole 24 (see FIG. 1) having a diameter 20, and forms a total or overall height 22 when attached to the rotatable member 14. Diameters 20 and 32, and heights 22 and 23, as well as other size and shape characteristics of the rotatable member 14 and shouldered washer 21 are determined according to the intended use of the rotating joint 10, but preferably are selected to provide a reduced or slim profile that will allow the rotating joint 10, particularly when applied on or on a vehicle, to pass through or be used within compact areas, such as smaller seat belt and/or other such vehicle trim openings.

Still looking at FIG. 2A, the middle portion 18C of shouldered washer 21 is disposed or positioned within, and circumscribed by, a larger center opening or primary hole 39 formed in the rotatable member 14, such that the primary hole 39 of rotatable member 14 permits rotation of the rotatable member 14 in an unrestricted or unimpeded manner, i.e. avoiding any contact with middle portion 18C of the shouldered washer 21. The shoulder portion 18A is preferably deformed, rolled, or otherwise modified or constructed so that the shouldered washer 21 secures or captures the rotating member 14. This step may be accomplished separately from the application of rotating joint 10 to a vehicle. For example, in assembling a vehicle using the rotating joint 10 of the invention, a rotatable member 14 may be ordered or procured separately as a single or unitary piece having a pre-attached shouldered washer 21, thus simplifying component acquisition, shipping, storage, and/or other component design factors, as well as installation of the rotating joint 10. Alternately, the shouldered washer 21 may be formed without a lip 25 and retained with respect to the rotatable member 14 by means of, for example, an inexpensive plastic retainer cap (not shown) that is snapped onto or slipped over the shoulder portion 18A, with a fastener 27 (see FIG. 3) providing an axial retaining force or clamping load once the rotating joint 10 is fully assembled.

Figure 2B:
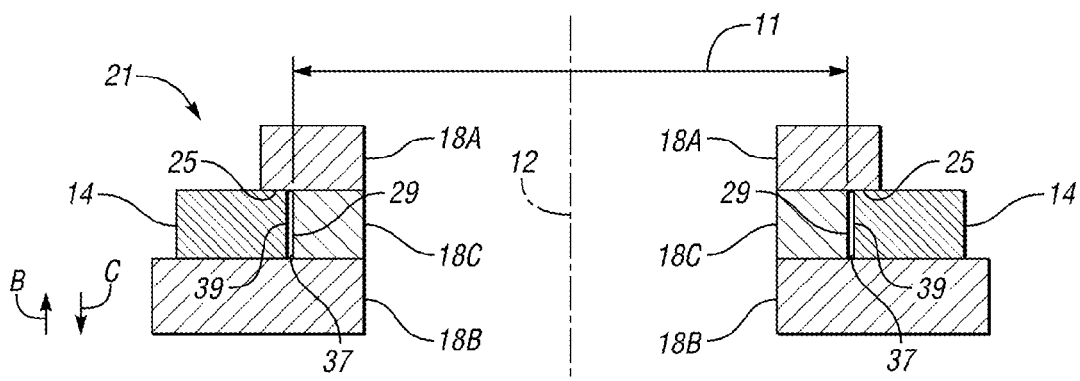
FIG. 2B is a cutaway side view of a portion of the rotating joint of FIG. 2B.

Turning to FIG. 2B, the shouldered washer 21 is shown in more detail in cutaway side view taken along line 2B of FIG. 2A and enlarged to show further detail. Lip 25 or another suitable extension of the shoulder portion 18A is shown overhanging or projecting over a portion of the rotatable member 14, thereby blocking or otherwise preventing the rotatable member 14 from moving in one axial direction, as represented by arrow B. Base portion 18B is constructed to prevent axial movement of the rotatable member 14 in the other direction, i.e. the direction of arrow C. Middle portion 18C is provided with an outer diameter 11 that is selected or sized sufficiently smaller than the primary hole 39 of rotatable member 14 in order to provide an acceptable gap or clearance 37 therebetween, thus enabling the rotatable member 14 to rotate freely around or about the axis of rotation 12. Preferably, clearance 37 is selected to permit free rotation as described hereinabove, while also minimizing or preventing a loose or "wobbly" fit. Likewise, diameter 20 (see FIG. 2A) is also preferably selected according to the size of bolt or fastener 27 selected (see FIG. 3), allowing the fastener 27 to pass unimpeded therethrough.

Figure 3:
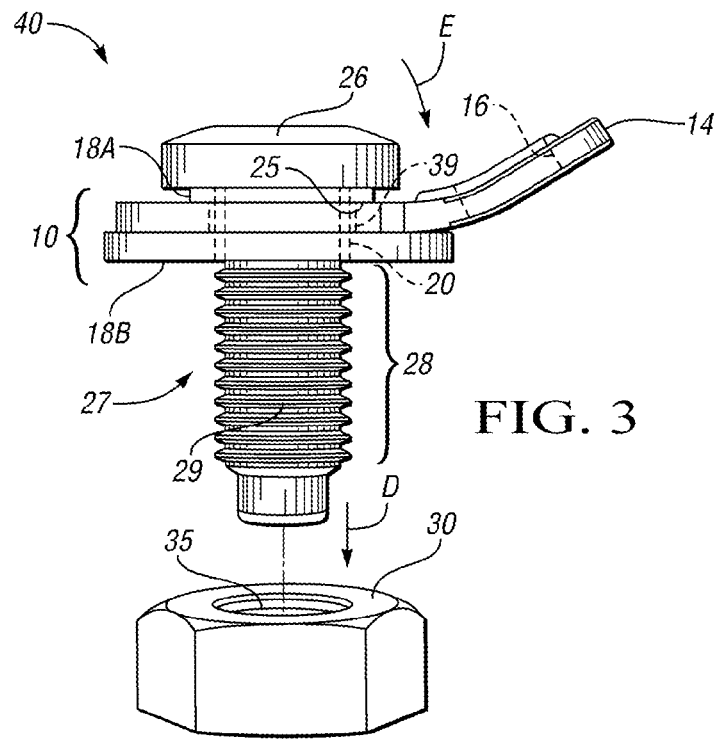
FIG. 3 is a perspective side view of the rotating joint of FIGS. 1, 2A, and 2B having a center bolt and nut.

Turning now to FIG. 3, a rotating joint assembly 40 is shown with the rotating joint 10, as previously described, and further including a fastener 27 and threaded receptacle 30. The fastener 27, preferably a standard non-shouldered bolt as shown, i.e. an off-the-shelf screw, lag bolt, rivet, or other suitable attachment having a head 26 and a shaft 28 with threads 29 that, when mated with a threaded receptacle 30 having a threaded opening 35, i.e. a nut as shown or another such threaded receptacle or opening, is suitable for clamping and/or securing the rotating joint 10. When the fastener 27 is inserted into the threaded opening 35 in the direction represented by arrow D and tightened to a predetermined torque rating, a clamping force or load, represented by arrow E and provided by the head 26, is directed only to the shoulder portion 18A of shouldered washer 21, thus preventing rotation of the shouldered washer 21. However, the rotatable member 14, which rests or is captured by and/or within the middle portion 18C of the shouldered washer 21 (see FIG. 2), is free to rotate in two directions (see arrow A of FIG. 1). Accordingly, it is preferable to select appropriate materials of construction for the shouldered washer 21 so as to prevent sagging, plastic deformation, and/or material fatigue of the shouldered portion 18A, which may otherwise impart undesirable impingement or restriction to the rotatable member 14.

Figure 4:
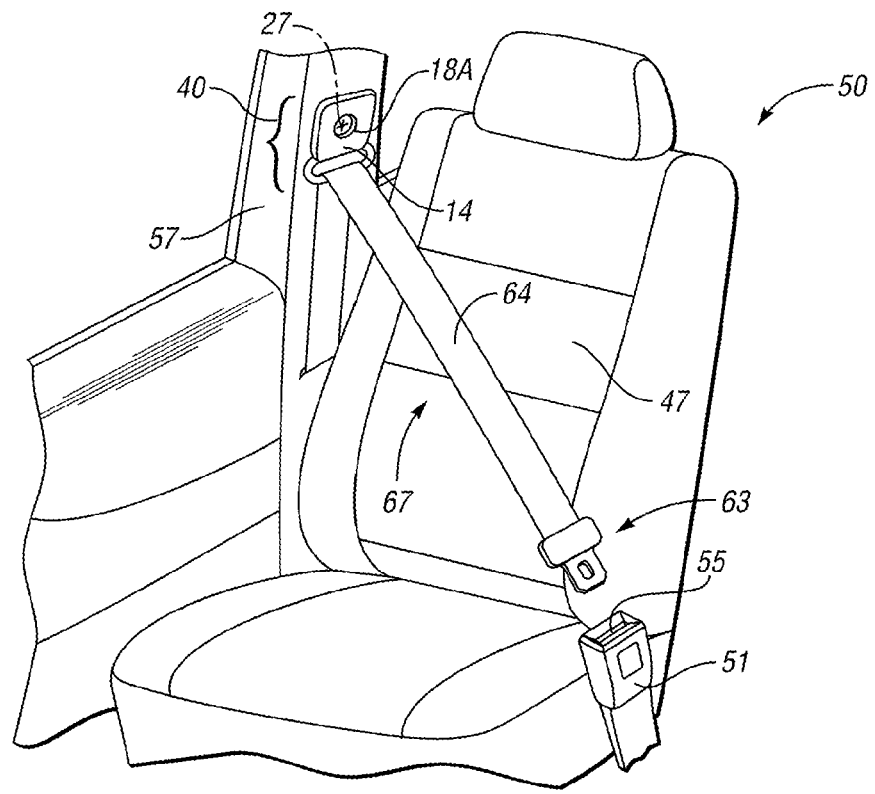
FIG. 4 is a fragmentary schematic perspective view of a vehicle interior having a rotatable seat belt anchor according to the invention.

Turning to FIG. 4, a vehicle interior 50 is shown having a seat 47 positioned adjacent to a side pillar or B-pillar 57. A seat belt assembly 67 includes a length of retractable seat belt webbing 64 and a buckle 63, which is insertable into a slot 55 of a buckle latch 51 and securable therein. The seat belt assembly 67 also includes a rotating joint assembly 40 configured as a seat belt anchor, as previously described hereinabove and shown in FIG. 1. Preferably, the rotating joint assembly 40 is secured directly to the B-pillar 57, with the rotatable member 14 being exposed, and with shoulder portion 18A of the shouldered washer 21 (see FIGS. 1 and 2) containing a fastener 27 therein. If the fastener 27 is exposed to view, the head 26 (see FIG. 3) is preferably constructed of an aesthetically pleasing material, such as polished or coated metal, that is complementary to the vehicle interior 50. Alternately, the fastener 27 may be hidden behind an attached trim plate (not shown) for an aesthetically finished appearance.

Using the rotating joint assembly 40 of the invention, the need for complex assemblies is reduced. Additionally, the elimination of shouldered bolts and/or other special fasteners in favor of standard, off-the-shelf components facilitates material acquisition while reducing the complexity of the rotating joint assembly 40, thus simplifying manufacturing and reducing overall manufacturing costs. Finally, the need for the various load distribution washers and/or spacers that are commonly used with typical rotating joints employing shouldered fasteners is also eliminated.

Another aspect of the invention is a method for attaching a mechanical joint, i.e. the rotating joint 10 to a vehicle or other structure. The method includes configuring or shaping a shouldered washer 21 with a sufficient shoulder portion 18A to capture a rotatable member 14 therein, such as the seat belt anchor shown in FIG. 1, to form a rotating joint 10. The method further includes applying a sufficient clamping load (arrow E) to the shouldered portion 18A of washer 21 via a non-shouldered fastener 27, the clamping load allowing the rotatable member 14 to rotate, as represented by arrows A of FIG. 1, while still retaining or maintaining the rotating joint 10 in an axial direction on the structure. In a preferred embodiment, the configuring of the shouldered portion 18A of shouldered washer 21, and the attachment or capturing of the rotatable member 14, are performed as separate preparatory steps to the applying of the clamping load, such that rotating joint 10 is provided as a combined unit, as shown in FIG. 1, for ready use within the rotating joint assembly 40 of FIGS. 3 and 4.

While the best modes for carrying out the invention have been described in detail, those familiar with the art to which this invention relates will recognize various alternative designs and embodiments for practicing the invention within the scope of the appended claims.

The invention claimed is:

1. A seat belt anchor assembly for securing a seat belt having seat belt webbing with respect to a vehicle interior, the seat belt anchor assembly comprising:
    a shouldered washer having a shoulder, a recessed middle portion and a base, said shoulder forming a lip at least partially overhanging said recessed middle portion and said base, and a through-hole formed entirely through said shouldered washer;
    a rotatable member having a first opening and a second opening, said first opening coaxially circumscribing said through-hole and said second opening being configured to receive said seat belt webbing; and
    a fastener circumscribed by said through-hole and having a shaft, and a threaded receptacle configured to receive said shaft; wherein said rotatable member is positioned around said recessed middle portion between said shoulder and said base, and is restricted from moving in the axial direction by said lip; and wherein said fastener applies a sufficient clamping force on said shoulder when inserted into said receptacle to thereby retain said assembly to said vehicle interior and to allow said rotatable member to freely rotate.

2. The seat belt anchor assembly of claim 1, wherein said fastener is a standard, non-shouldered fastener.

3. The seat belt anchor of claim 1, wherein said seat belt anchor does not include a load distribution washer.

4. The seat belt anchor assembly of claim 1, wherein said shoulder is a rolled portion of said shouldered washer.

\* \* \* \* \*